Nov. 18, 1952     F. M. FRAGA     2,618,211
DRAFT ADJUSTMENT MEANS FOR TRACTOR PULLED IMPLEMENTS
Filed Nov. 30, 1948
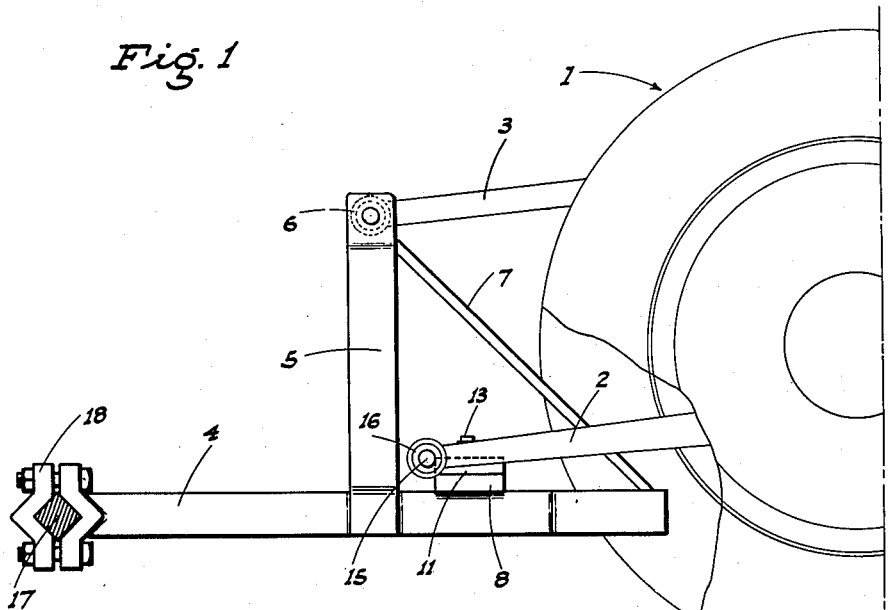
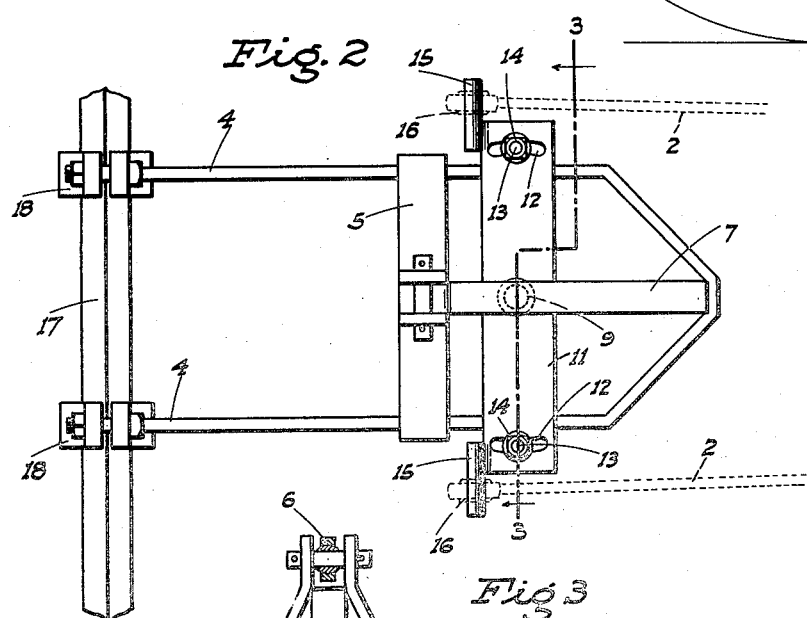
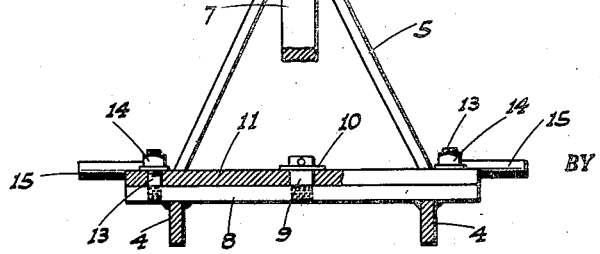
INVENTOR
F. M. Fraga
BY
ATTYS Patented Nov. 18, 1952

2,618,211

UNITED STATES PATENT OFFICE 2,618,211

DRAFT ADJUSTMENT MEANS FOR TRACTOR PULLED IMPLEMENTS

Frank M. Fraga, Reedley, Calif.

Application November 30, 1948, Serial No. 62,735

1 Claim. (Cl. 97—47)

This invention relates generally to improvements in draft control means for tractor pulled implements and as to all common matter disclosed is a continuation in part of application Serial No. 693,139, filed August 26, 1946, now Patent No. 2,456,693, issued December 21, 1948.

The invention is particularly directed to that type of tractor drawn implement commonly referred to as an off-set plow or harrow in which, when the implement is connected to and being drawn by a tractor in off-set relation thereto, the side thrust against the plow tends to cause the tractor to turn from a straight path of travel rendering it difficult for the operator to steer the tractor in a straight line. This tendency to affect the straight line travel varies, of course, according to the degree of offset of the implement relative to the tractor.

It is the object of the invention to provide an adjustment means for the implement whereby when the implement is offset laterally in any predetermined degree relative to the line of draft of the tractor it may also be angled relative to such line of draft to a degree necessary to compensate for and relieve the side thrust against the implement and thus overcome the tendency of such side thrust to cause the tractor to turn from a straight path.

A further object of the invention is to produce a practical device and one which will be exceedingly effective for the purpose for which it is designed.

These objects are accomplished by means of such structure and relative arrangement of parts as will fully appear by a perusal of the following specification and claim.

In the drawings:

Figure 1 is a side elevation, partly broken out and in section, showing a hitch for connecting the implement to a tractor and which hitch embodies the adjustment means which constitutes the invention.

Figure 2 is a top plan view of the hitch.

Figure 3 is a sectional view of a line 3—3 of Fig. 2.

Referring now more particularly to the characters of reference on the drawings, the numeral 1 designates generally the tractor by which the implement is to be pulled. In the form here shown this tractor is of the type in which the draft connections with the implement embody a pair of lift links 2 and an upper compression link or bar 3.

In carrying out the present invention there is provided a hitch for connecting the drawn implement to the elements 2 and 3 of the tractor. This hitch comprises a substantially rectangular main frame 4. Upstanding from this main frame and rigidly connected thereto is an A-frame 5. The outer end of the link 3 is connected to the upper end of this A-frame by a swivel joint 6. A brace bar 7 extends from the forward end of the main frame 4 to the upper end of the A-frame 5 and is rigidly connected to both.

Forwardly of the A-frame 5 and rigid with the main frame 4 is a flat cross plate 8. Threaded into the plate 8, substantially midway between its ends is a vertical pivot pin 9 having an annular flange 10 thereon spaced above the plate 8. Interposed between the flange 10 and the plate 8 and about the pin 9 is another flat plate 11 which is substantially symmetrical with respect to and which rides on the top of the plate 8.

Adjacent each end of the plate 11 an arcuate slot 12 is provided which is concentric with the vertical axis of the pin 9. Upstanding studs 13 are fixed in the plate 8 and such studs project through the slots 12. Clamping nuts 14 are threaded on the upper end of the studs 13 and are normally tightened down against the plate 11 to hold the plate 8 immobile relative to the plate 11. Upon loosening of the nuts 14 the plate 8 is free to be turned relative to the plate 11 about the axis of the pivot pin 9 and clamped in any adjusted position by again tightening the nuts 14.

At each end of the plate 11 is a laterally projecting pin 15. By means of swivel joints 16 each of the links 2 is connected to one of these pins 15. Thus through the medium of the links 2 and 3 the hitch as a whole is supported by and in draft relation with the tractor 1.

17 is the tool bar for carrying the implement to be drawn by the tractor which implement may be a disc harrow or other selected ground working tool. This tool bar is secured by releasable clamps 18 to the rear end of the main frame 4. By releasing the clamps 18 the bar 17 may be shifted laterally of the longitudinal center line or line of draft of the tractor; and then fixed in any adjusted position by again tightening the clamps 18. Thus when disc or other plows are carried on the tool bar 17 they may be offset and fixed relative to the center line of draft of the tractor to any desired degree.

When the hitch is connected to the tractor there is, of course, a substantially straight line pull against the hitch, and consequently the tool carried by the tool bar, along substantially the longitudinal center line of the tractor. If the tool carried by the bar 17 was directly behind the tractor there would be little, if any, side thrust against the same and such tool would probably trail in substantial alinement with the line of draft of the tractor and there would be no trouble in steering the tractor.

However, with the use of such tools as disc harrows or other plow implements it is customary to off-set them so that they work into the soil to one side or the other of the tractor. In the present instance, this off-setting would be accomplished by shifting the tool supporting bar transversely of the longitudinal center-line of the tractor.

Thus off-set relative to the center line of the tractor, and when the harrow cuts into the soil, the side thrust or pressure against the plow elements tends to swing the tool as a whole back into the direct line of draft along the center line of the tractor, and this tendency increases in accordance with the extent to which the tool is off-set. However, the operator desires to maintain the tool cutting into the soil in its off-set position and, therefore, he must steer the tractor to hold it in line with the straight line of draft. Since the tendency of the tool to return to such straight line of draft is very great, the resultant pressures are constantly tending to swing the tractor out of the line of draft and the operator must constantly fight this condition through the steering mechanism of the tractor. These conditions would constantly prevail except for the adjustable feature of the present invention which may be made useful to overcome this tendency of the tool to turn the tractor by reason of the following adjustment of the parts.

After the operator has off-set his implement to the degree desired, he then loosens the bolts 14 and operates the tractor. The resulting side thrust then acts against the tool to swing the same about the pivot pin 9 until the side thrust is compensated for or overcome. In other words, instead of the side thrust then tending to turn the tractor, it merely turns the hitch frame 4 until the tool is relieved of said side thrust to a point where the tractor may be driven in a straight line without the side thrust tending to turn the same. When this point is reached the nuts 14 are again tightened and the frame 4 is then held at that angle relative to the longitudinal center line of the tractor at which the side thrust against the tool would be substantially ineffectual to tend to turn the tractor out of the straight line.

In addition to the functioning of the parts for the above described result, the swinging adjustment of the hitch frame also tends to maintain both ends of an offset double gang disc harrow in the proper cutting depth in the ground, since the objectionable side thrust also tends to lift one end of the discs higher than the other resulting in an uneven depth of cutting into the soil.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful and upon which Letters Patent is desired:

In combination with a pulling tractor which is provided with a pair of lower lifting links and an upper compression link, an implement hitch; such hitch comprising a substantially horizontal main frame, an upwardly projecting A-frame rigid with the main frame, means swivelly connecting the upper end of the A-frame with one end of the compression link, a flat draft plate disposed transversely of the line of draft of the tractor, means swivelly connecting each of the lifting links with one end of said draft plate, means pivotally connecting the main frame to said draft plate for swinging movement in a horizontal plane, means for fixing the main frame rigid with the draft plate in any adjusted position relative thereto, a tool bar, and means for releasably clamping the tool bar to the main frame for adjustment thereon transversely of the line of draft of the tractor.

FRANK M. FRAGA.

REFERENCES CITED

The following references are of record in the file of this patent:

UNITED STATES PATENTS

| Number | Name | Date |
|---|---|---|
| 2,320,141 | Kott | May 25, 1943 |
| 2,333,837 | Wibbels | Nov. 9, 1943 |
| 2,379,225 | Fraga | June 26, 1945 |
| 2,417,595 | Heath | Mar. 18, 1947 |
| 2,430,732 | Orelind | Nov. 11, 1947 |
| 2,463,169 | Grewe | Mar. 1, 1949 |
| 2,512,114 | Robinson et al. | June 20, 1950 |
| 2,515,637 | Dooley et al. | July 18, 1950 |